US007404922B2

(12) United States Patent
Kohyama et al.

(10) Patent No.: US 7,404,922 B2
(45) Date of Patent: Jul. 29, 2008

(54) METHOD FOR PRODUCING SIC FIBER-REINFORCED SIC COMPOSITE MATERIAL BY MEANS OF HOT PRESS

(75) Inventors: Akira Kohyama, Uji (JP); Yutai Katoh, Uji (JP)

(73) Assignee: Japan Science and Technology Corporation, Saitama (JP)

(*) Notice: Subject to any disclaimer, the term of this patent is extended or adjusted under 35 U.S.C. 154(b) by 462 days.

(21) Appl. No.: 10/473,853

(22) PCT Filed: Oct. 25, 2001

(86) PCT No.: PCT/JP01/09363

§ 371 (c)(1), (2), (4) Date: Oct. 2, 2003

(87) PCT Pub. No.: WO02/081405

PCT Pub. Date: Oct. 17, 2002

(65) Prior Publication Data

US 2004/0113332 A1 Jun. 17, 2004

(30) Foreign Application Priority Data

Apr. 3, 2001 (JP) ............................ 2001-104186

(51) Int. Cl.
*C04B 35/645* (2006.01)

(52) U.S. Cl. ........................ 264/641; 264/642; 264/682

(58) Field of Classification Search ................ 264/29.2, 264/29.3, 625, 640, 641, 642, 682
See application file for complete search history.

(56) References Cited

U.S. PATENT DOCUMENTS

| | | | | |
|---|---|---|---|---|
| 5,439,627 | A * | 8/1995 | De Jager | 264/129 |
| 5,707,471 | A * | 1/1998 | Petrak et al. | 156/89.27 |
| 2005/0001361 | A1* | 1/2005 | Kohyama et al. | 264/500 |

FOREIGN PATENT DOCUMENTS

| | | |
|---|---|---|
| EP | 1 024 121 A2 | 8/2000 |
| JP | 02-199063 | 8/1990 |
| JP | 05-221739 | 8/1993 |

(Continued)

OTHER PUBLICATIONS

Mazdiyasni, K.S. (1990). Fiber Reinforced Ceramic Composites. (pp. 222-251). William Andrew Publishing/Noyes.□□Online version available at:□□http://www.knovel.com/knovel2/Toc.jsp?BookID=364&VerticalID=0.*

(Continued)

*Primary Examiner*—Carlos Lopez
(74) *Attorney, Agent, or Firm*—The Webb Law Firm

(57) ABSTRACT

A powdery mixture of fine SiC powder with one or more oxide sintering additives of $Al_2O_3$, $Y_2O_3$, $SiO_2$ and CaO is blended and uniformly dispersed in a polymeric SiC precursor to prepare a matrix-forming polymeric slurry. A preform of SiC fiber, which has quasi-stoichiometric composition with high crystallinity, is impregnated with the polymeric slurry and then hot-pressed at a temperature of 1600° C. or higher in presence of a liquid phase. Since the heat-resistant SiC fiber is used as strengthening fiber, the prepreg is sintered to a dense SiC composite excellent in mechanical properties by one-step hot-pressing.

2 Claims, 2 Drawing Sheets

(a) 1720°C (b) 1750°C (c) 1780°C

10 μm 10 μm 10 μm

FOREIGN PATENT DOCUMENTS

| | | |
|---|---|---|
| JP | 06-287079 | 10/1994 |
| JP | 09-041225 | 2/1997 |
| JP | 11-130552 | 5/1999 |

OTHER PUBLICATIONS

A. Lacombe & C. Bonnet, "Ceramic Matrix Composites, Key Materials for Future Space Plane Technologies", AIAA-90-5208, AIAA Second International Aerospace Planes Conference, AERO/M.E. Library, TL787 A12, No. 90-5208, pp. 1-14).

G.W. Hollenberg, et al., "The effect of irradiation on the stability and properties of monolithic silicon carbide and $SiC_1$/SiC composites up to 25 dpa", Journal of Nuclear Materials 219 (1995), pp. 70-86.

* cited by examiner

METHOD FOR PRODUCING SIC FIBER-REINFORCED SIC COMPOSITE MATERIAL BY MEANS OF HOT PRESS

INDUSTRIAL FIELD OF THE INVENTION

The present invention relates to a hot-pressing method of manufacturing a SiC fiber-reinforced SiC-matrix composite useful as structural members of aircraft, spacecraft, nuclear reactors, nuclear fusion power reactors or the like, which are exposed to a high-temperature atmosphere or driven under severe conditions.

BACKGROUND OF THE INVENTION

Various ceramics such as SiC and $Si_3N_4$, which have good properties such as heat-resistance, corrosion-resistance and mechanical strength, have been developed so far for structural members of aircraft, spacecraft, nuclear reactors or the like driven under severe conditions. Such ceramics are also used as members of heat exchangers or mechanical seals driven under heavy-duty conditions. Especially, SiC is a suitable material in various industrial fields from aerospace to nuclear power generation, due to its excellent heat- and wear-resistance as well as chemical stability and reduced-activation property in a nuclear environment.

SiC is brittle itself, despite of good high-temperature property with a sublimation temperature higher than 2600° C. In order to overcome poor toughness, a SiC fiber-reinforced SiC-matrix composite (hereinafter referred to as merely "a SiC composite") has been proposed, as reported in A. Lacombe and C. Bonnet, 2nd Int. Aerospace Planes Conf. Proc. AIAA-90-5208 (1990) and C. W. Hollenberg et al., J. Nucl. Mat., 219, (1995)70-86.

Several methods, e.g. hot-pressing and liquid-phase sintering, have been developed so far for manufacturing a SiC composite. However, it is very difficult to manufacture a SiC composite good of thermal conductivity, density and strength, so that the same steps are necessarily repeated in order to improve properties of the SiC composite. Repetition of the same steps complicates a manufacturing process and raises a manufacturing cost. Moreover, members with complicated profiles cannot be manufactured with ease due to repetition of the same steps. In this meaning, a SiC composite has not been available for industrial application, yet.

Although a polymer impregnation and pyrolysis process, hot-pressing and liquid-phase sintering are regarded as methods, which will be industrially adopted in near future, there still remains the problem that a sintering temperature can not be elevated to a level enough to improve properties of a SiC composite without damages of SiC fiber. Due to the restriction on the sintering temperature, properties of the SiC matrix are not well improved. For instance, when SiC fiber synthesized from polycarbosilane is used for manufacturing a SiC composite, a sintering temperature is necessarily predetermined not higher than 1600° C. even in short-time heat-treatment, since heat-resistance of SiC fiber itself is 1300° C. or so at highest. The sintering temperature below 1600° C. is too low to promote a liquid-phase sintering reaction. Consequently, a heat-treated SiC composite is not well densified and poor of thermal and mechanical properties.

SUMMARY OF THE INVENTION

The present invention aims at provision of a dense SiC composite having good mechanical properties. An object of the present invention is to manufacture a SiC composite by one-step hot-pressing. Another object of the present invention is to enable heat-treatment of a SiC composite at an elevated temperature in a simple and cheap hot-pressing process.

According to a hot-pressing method proposed by the present invention, fine SiC powder is premixed with one or more oxide powders of $Al_2O_3$, $Y_2O_3$, $SiO_2$ and CaO as sintering additives. A slurry is prepared by blending the powdery mixture with a polymeric SiC precursor. A preform of SiC fiber, which has quasi-stoichiometric composition with high crystallinity, is impregnated with the slurry and then hot-pressed at a temperature of 1600° C. or higher in presence of a liquid phase. A pressure, which is applied to the prepreg during hot-pressing, is preferably controlled to 10-20 MPa.

BEST MODES OF THE INVENTIONS

Figure 1:
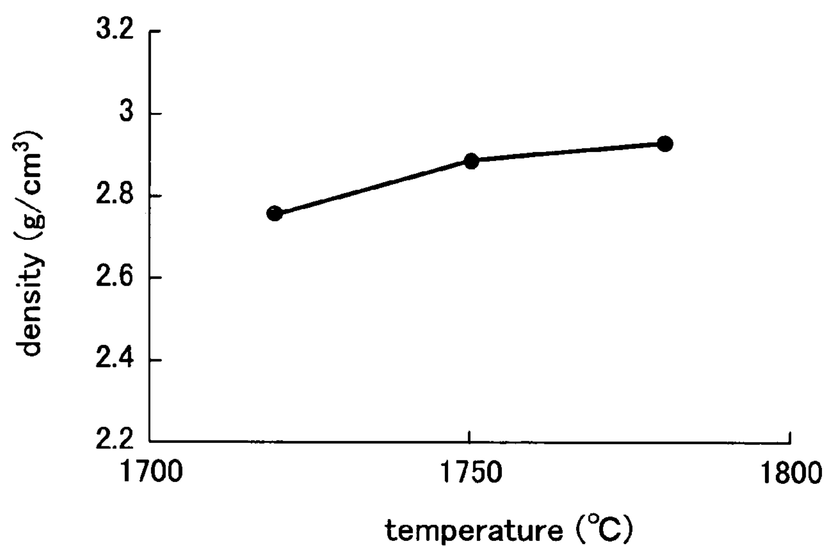
FIG. 1 is a graph showing an effect of a sintering temperature on density of a SiC composite, which was hot-pressed with a pressure of 15 MPa.

The proposed SiC composite is reinforced with SiC fiber, which has quasi-stoichiometric composition with high crystallinity. Since impurity content in the SiC fiber is controlled as small as possible except small amounts of Ti, Zr, Nb, Y and Mg, the SiC fiber can be heated at a temperature of 1600° C. or higher without degradation of mechanical properties. As a result, a SiC preform impregnated with a slurry can be hot-pressed to a dense and strengthened structure at an elevated temperature.

Fine SiC powder mixed with a sintering additive may be added to a polymeric SiC precursor to prepare a slurry. When a SiC fiber preform impregnated with the slurry was hot-pressed, a SiC matrix is formed without degradation of the SiC fiber. The sintering additive may be one or more of metal oxides such as $Al_2O_3$, $Y_2O_3$, $SiO_2$ and CaO. A ratio of the sintering additive to the fine SiC powder is preferably adjusted to 5-15 mass %. The fine SiC powder and the sintering additive are preferably of 0.02-0.3 μm in particle size for infiltration into the SiC fiber preform.

The sintering additive is reacted with a surface layer of the fine SiC powder and converted to a complex compound, which partially involves a liquid, during high-temperature sintering. Formation of the complex compound accelerates a sintering reaction of the fine SiC powder and densification of the prepreg.

A slurry is prepared by uniformly blending fine SiC powder and a sintering additive with a polymeric SiC precursor. A representative SiC precursor is polycarbosilane, but polyvinylsilane, polymethylsilane or a polymeric mixture thereof is also used as the SiC precursor. A certain solvent may be optionally used for preparation of the slurry based on such a solid SiC precursor as polycarbosilane, but such a liquid SiC precursor as polyvinylsilane or polymethylsilane does not need a solvent.

A ratio of the polymeric SiC precursor in the slurry is preferably adjusted to 20-80 mass %. Although the slurry changes its fluidity in response to kinds and particle sizes of the SiC powder and the sintering additive, the fluidity is maintained at a level suitable for sufficient impregnation of a SiC fiber preform with the slurry by controlling the ratio of the SiC precursor. If a ratio of the SiC precursor is less than 20 mass %, the slurry is too viscous to infiltrate into the SiC fiber preform for densification of a prepreg. However, an excess of the SiC precursor above 80 mass % causes uneven distribution of the SiC fiber and the SiC precursor, resulting in defects such as cracks.

A prepreg is sintered by a hot-pressing process at a temperature of 1600° C. or higher in presence of a liquid phase. A pressure during sintering is preferably controlled to 10-20 MPa.

Sintering conditions are controlled in relation of a sintering temperature with a pressure. If the sintering temperature or the pressure is too lower, a sintering reaction is not well promoted so that a manufactured SiC composite will be inferior in density, strength, thermal conductivity and airtightness. If the sintering temperature or the pressure is too higher, the SiC fiber is damaged so that a manufactured SiC composite will be weakened. The sintering temperature and the pressure are determined within ranges of 1600-1850° C. and 10-20 MPa, respectively, referring to objective properties of the SiC composite. The sintering temperature in relation with the pressure is properly determined from ranges of 1700-1750° C. and 10-15 MPa in an industrial point of view for manufacturing a SiC composite with well-balanced properties.

Sufficient infiltration of the polymeric SiC precursor between SiC filaments is realized due to use of SiC fiber having quasi-stoichiometric composition with high crystallinity, specified SiC powder and a sintering additive for formation of a SiC matrix, a polymeric SiC precursor for impregnation of SiC fiber preform and elevation of a sintering temperature, as mentioned above. The sufficient infiltration of the polymeric SiC precursor enables liquid-phase sintering, so as to manufacture a SiC composite having density more than 2.9 g/$cm^3$ and strength higher than 400 MPa by one-step hot-pressing.

The other features of the present invention will be understood from the following Example, referring to the drawings.

A sintering additive was prepared by mixing $Al_2O_3$ powder of 0.3 μm in particle size with $Y_2O_3$ powder of 1 μm in particle size. The sintering additive was added to β-SiC powder of 0.02 μm in particle size at a ratio of 10 mass %. The powdery mixture was blended in polycarbosilane at a mass ratio of 1:1 in presence of hexane (a solvent) to prepare a polymeric SiC precursor for formation of a SiC matrix.

Plain-woven cloth of SiC fiber (offered as Tyranno™-SA by Ube Industries, Ltd.) of 40 mm×20 mm in size was impregnated with the polymeric SiC precursor. A prepreg was heated up to 800° C. at a heating rate of 300° C./hour in an argon atmosphere, held 10 minutes at 800° C. and then cooled down to a room temperature over one hour or longer. When the cooled prepreg was observed by a microscope, it was noted that the solidified SiC precursor was integrated with the SiC fiber.

8 sheets of the prepreg were laminated together to a preform of 2 mm in thickness. The preform was put in a carbon mold and located in an oven equipped with a carbon heater. The preform was heated up to 1720-1780° C. at a heating rate of 300° C./h in an argon atmosphere under application of a uniaxial pressure of 15 MPa along its perpendicular direction, held at 1720-1780° C. for 10 minutes and then cooled down in a pressure-released state over 2 hours or longer.

The manufactured SiC composite was examined to research an effect of a sintering temperature on its volume density. Results shown in FIG. 1 prove that density of the SiC composite was improved as elevation of the sintering temperature. As an example, a SiC composite sintered at 1780° C. had density of 2.95 g/$cm^3$, and a SiC composite hot-pressed at 1750° C. with 15 MPa had flexural strength of 410 MPa.

Figure 2:
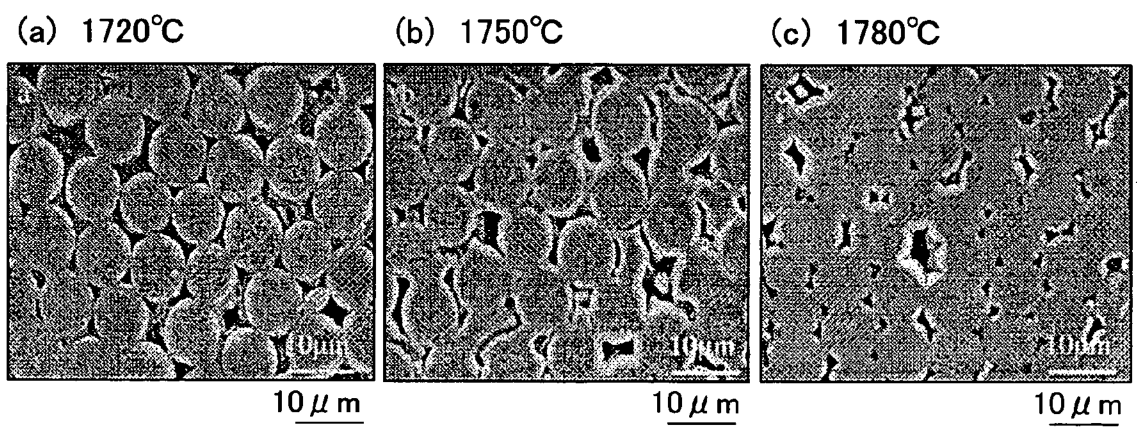
FIG. 2 is microscopic views showing inner cavities of SiC composites, which were hot-pressed with a pressure of 15 MPa.

Several prepregs were hot-pressed with 15 MPa at 1720° C., 1750° C. and 1780° C. Formation of SiC matrix inside SiC fiber was differentiated in response to the sintering temperature, as shown in FIG. 2. When a prepreg was sintered at 1720° C., many cavities occurred between SiC filaments but discontinued without growth to big size. Therefore, SiC matrix was regarded as well-formed between SiC filaments. Improvement of SiC matrix in density was clearly noted as elevation of the sintering temperature from 1750° C. to 1780° C.

Figure 3:
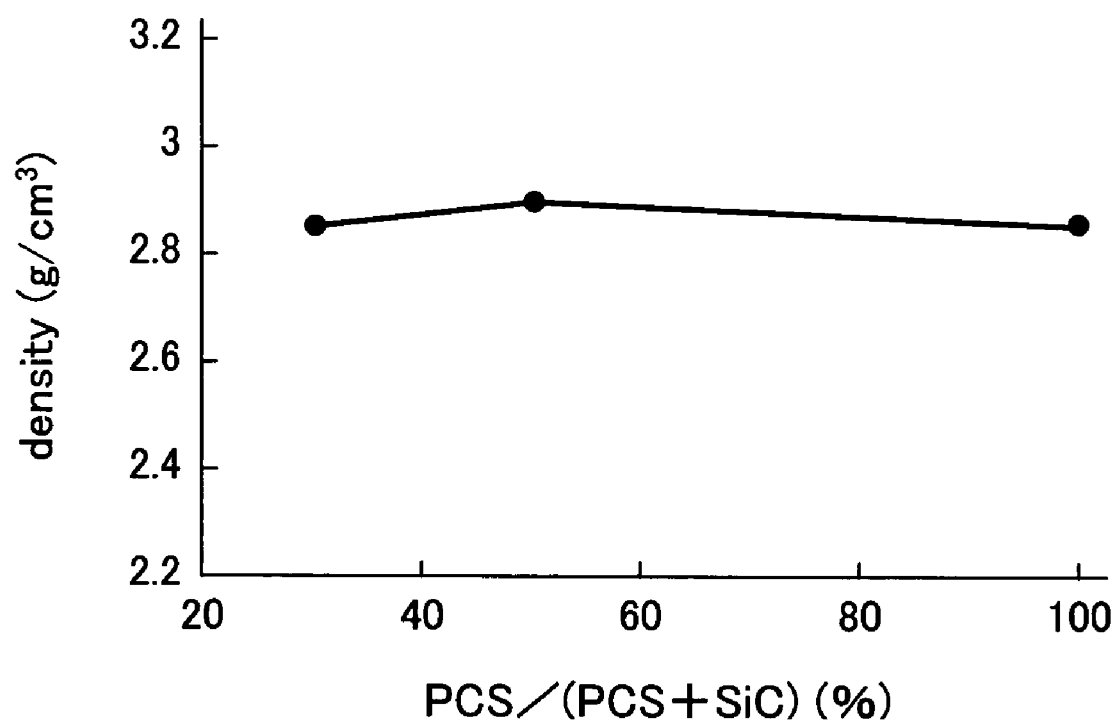
FIG. 3 is a graph showing an effect of a polymer ratio of a slurry on density of a SiC composite.

Furthermore, SiC fiber preforms impregnated with several slurries, which were prepared by blending polycarbosilane with a powdery mixture of fine SiC powder and a sintering additive at various ratios, and then hot-pressed at 1750° C. with 15 MPa. Density of each SiC composite was measured and evaluated in relation with a sintering temperature. It is understood from results are shown in FIG. 3 that densification of the SiC composite is promoted as increase of polycarbosilane content. That is, density of the SiC composite approximated 2.9 g/$cm^3$ at polycarbosilane content of 30 mass % or more, and reached 2.9 g/$cm^3$ at polycarbosilane content near 50 mass %. However, a SiC composite, which was manufactured by hot-pressing SiC fiber preform impregnated with a polymeric slurry consisting of polycarbosilane only, had the structure that many cavities were unfavorably present inside SiC fiber, resulting in cracks and poor strength.

INDUSTRIAL APPLICABILITY OF THE INVENTION

According to the present invention as above-mentioned, SiC fiber, which has quasi-stoichiometric composition with high crystallinity, is used as strengthening fiber, and SiC fiber preform is impregnated with a polymeric SiC precursor, which contains fine SiC powder and a sintering additive therein. The prepreg is hot-pressed at an elevated sintering temperature due to the specified SiC fiber without damages, and a sintering reaction is advantageously promoted due to presence of the sintering additive. Consequently, a SiC composite, which has a dense structure of 2.9 g/$cm^3$ or more and strength of 400 MPa or higher, can be manufactured by one-step hot-pressing.

The invention claimed is:

1. A hot-pressing method of manufacturing a SiC-matrix composite reinforced by SiC fiber, which comprises the steps of:

providing a powdery mixture of fine SiC powder with one or more sintering additives selected from $Al_2O_3$, $Y_2O_3$, $SiO_2$ and CaO;

preparing a matrix-forming slurry by blending said powdery mixture in a polymeric SiC precursor;

impregnating a preform of SiC fiber, which has quasi-stoichiometric composition with high crystallinity, with said slurry; and hot-pressing said SiC fiber impregnated preform at a temperature between 1600° C. and 1850° C. with a pressure of 10-20 MPa in presence of a liquid phase resulting from reaction of the sintering additive or additives with fine SiC powder.

2. The hot-pressing method defined by claim 1, wherein the polymeric SiC precursor is one or more of polycarbosilane, polyvinylsilane and polymethylsilane.

* * * * *